Figure 1:
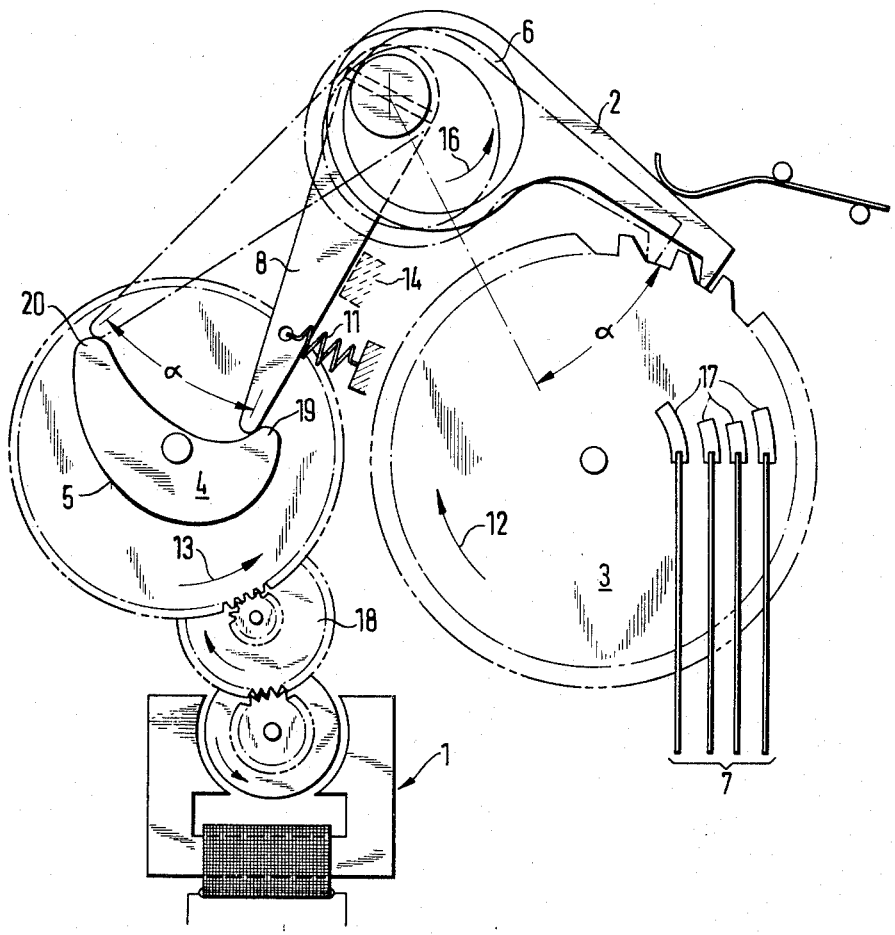

United States Patent
Holzer

[15] 3,678,769
[45] July 25, 1972

[54] ECCENTRIC AND KNEE LEVER DRIVE FOR MECHANICAL CONTROL ELEMENTS

[72] Inventor: Walter K. Holzer, Meersburg, Germany
[73] Assignee: Holzer Patent AG, Zug, Switzerland
[22] Filed: Oct. 19, 1970
[21] Appl. No.: 81,968

[30] Foreign Application Priority Data
Oct. 27, 1969 Germany.................P 19 54 023.9

[52] U.S. Cl.................................................74/118, 74/142
[51] Int. Cl..........................................................F16h 27/02
[58] Field of Search...............74/118, 116, 117, 119, 142, 74/144, 126, 128

[56] References Cited
UNITED STATES PATENTS

| | | | |
|---|---|---|---|
| 2,868,026 | 1/1959 | Finehout et al. | 74/142 |
| 3,237,464 | 3/1966 | Cartier | 74/142 |
| 3,522,742 | 8/1970 | Behrens | 74/142 |
| 1,735,923 | 11/1929 | Helgeby | 74/116 |
| 3,072,910 | 1/1963 | Snyder | 74/116 |
| 2,945,169 | 7/1960 | Carr | 74/116 |

Primary Examiner—William F. O'Dea
Assistant Examiner—Wesley S. Ratliff, Jr.
Attorney—Watson, Cole, Grindle & Watson

[57] ABSTRACT

A device for the gradual movement of a mechanical control element as a cam disk or roller having an energy accumulator that can be charged by an engine and which upon discharge moves the control element by mechanical means.

5 Claims, 2 Drawing Figures

ECCENTRIC AND KNEE LEVER DRIVE FOR MECHANICAL CONTROL ELEMENTS

This invention relates to a device for the gradual movement of a mechanical control element, especially of a cam disk or roller with an energy accumulator that can be charged by an engine and which upon discharge moves the control element by means of mechanical means, especially a pawl drive.

Control elements of the initially described type are used in automatic cycle operations for the operation of electric contacts. In the case of such automatic cycle operations, it is important that the control element, therefore for example the cam disk, is moved gradually from one position into the next. For the gradual movement of such control elements several mechanical means have already been known. Thus for example, thrust pawls are pre-tensioned upon their return and are suddenly released for the conveyance of the control element. The springs necessary for this latter must transmit relatively large spring forces to the pawl in order to make possible a certain switching operation. Therefore one can start out from the fact that the spring power in the area of the pawl movement is almost constant. The speed of the moved pawl will thus be initially equally great even between standstill and final release. This in turn however, has the drawback that the cam disk which has been conveyed will be moved still a little further than would correspond to the path of the pawl on the basis of the high speed of the thrust pawl lasting to the end. Therefore, the much objectionable "overhurling" of the cam disk or roller cannot be prevented with this pawl arrangement.

Besides this, it has been known to realize the pawl drive with the aid of an eccentric and these eccentrics have been arranged in relation to the longitudinal movement of the thrust pawl in such a way that they will impart a maximum speed to the pawl with the greatest deflection thereof. The previously mentioned overhurling also occurs as a result of this arrangement.

The attempt then was made to prevent this overhurling by providing the control disk with a toothed worm wheel, which engages with a worm longitudinally shiftable on a driving shaft (German Pat. No. 1,101,891). The longitudinally shiftable worm was driven by means of drivers and at the same time it was shifted on the shaft by an overrunning ramp with fixed support and with a linear incline of the same pitch as the worm counter under the effect of a tension spring until it had passed the highest point of the overrunning ramp and switched the control disk further through its recoil. With this arrangement it is true the overhurling could be suppressed but not eliminated. Besides the wear and tear of the worm is unbearably great.

The arrangement last mentioned was theoretically improved by a proposal of the applicant, (German published Pat. No. 1,299,190) by the development of a gliding path on which the shifting worm slides back during conveyance of the control disk in such a way that the worm slides back under dampened condition. This proposal of the applicant to be sure offers a further improvement for the suppression of the overhurling. Unfortunately, however for one thing, the overhurling will not be completely eliminated either, and for another thing, the requirements made for the precision of the injection molded parts are very high. The tolerances of the dimensions of the shifting curve must indeed be maintained very precisely. Otherwise it might cause the shifting worm to slide back too dampened, as a result of which the safe switching of the contacts operated by the control disk will not be assured, or the shifting worm recoils too little dampened as a result of which in turn the overhurling will be increased.

It is an object of the present invention, avoiding the previously mentioned drawbacks of known arrangements, to create a device which completely suppresses the undesirable overhurling of control elements and which at the same time can be produced by mass production and as simply as possible, that is to say without high requirements of precision as well as with few parts. This requirement includes the further object that the device to be created will function as much as possible without additional complicated braking installations for the control element. According to the invention, the objective is solved by the energy accumulator supplying an acceleration with an invariable direction during its discharge producing the movement of the control element, and in that the effective connection between the energy accumulator and the mechanical driving means is produced by kinematics which converts this acceleration in an acceleration with alternating direction. The device according to the invention has various advantages as for instance since the pawl speed will drop prior to its maximum deflection, the conveyance of the control element will be concluded gently. Thus, no additional measures are required to slow down the control element and on the basis of this fact as well as because of the simple structure of the entire arrangement, the device according to the invention can be easily manufactured with few parts in mass production without high requirements of precision.

According to one development of the invention, the energy accumulator is developed as a spring element, especially as a tension or compression spring. According to a special design of the invention, the kinematics consist of an eccentric arrangement and according to another design of the invention, the kinematics consist of a toggle lever arrangement.

One design of the invention provides that the starting stroke of the pawl includes the dead center of the kinematics in relation to the maximum pawl deflection.

According to another object of the invention, the kinematics moves beyond the dead center.

An effective further development of the invention provides for the pawl deflection to be limited in such a way that the dead center of the kinematics, in relation to the maximum pawl deflection, cannot be reached.

According to an effective development of the invention, the spring element especially the tension or compression spring, engages with a cocking lever by which the kinematics can be operated.

Another object of the invention provides that the cocking lever can be deflected with the aid of a motor driven cam disk from its rest position and thus the energy accumulator can be charged.

According to another object of the invention, the cocking lever in its rest position fits against the cam of the cocking lever and a further development of the invention resides in the cocking lever in its rest position fitting against a locally fixed stop.

A still further object of the invention provides that the stationary stop be developed resiliently and another object of the invention resides in the energy accumulator, especially the spring, engaging the pawl.

Figure 2:
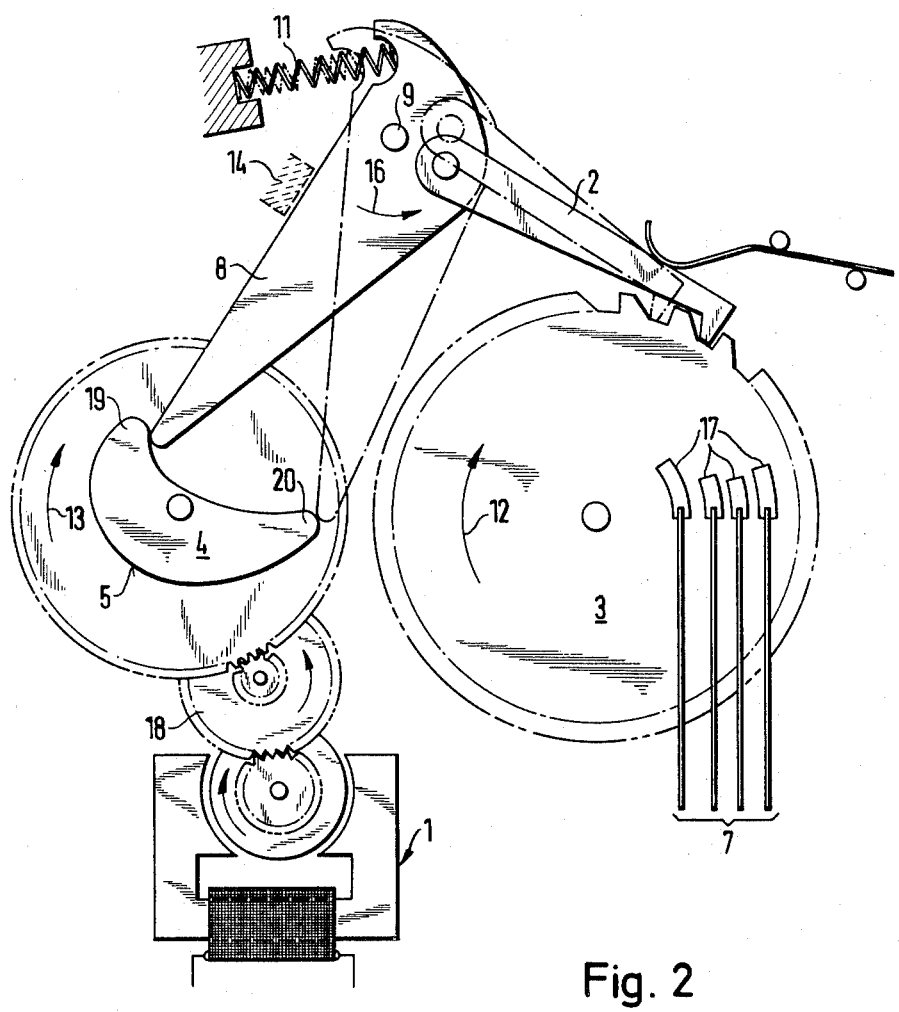

Further objects of the invention will be apparent from the following description when considered in connection with the drawing in which, FIG. 1 is a side view of the device according to the invention with an eccentric drive, and FIG. 2 is a side view of the device according to the invention with a toggle lever drive.

In FIG. 1, the cam disk 3, which is supposed to represent an embodiment of the control element by way of example, has cams 17 thereon, which on their part are scanned by scanning levers 7. In this case the scanning levers 7 may be part of an electric switch, and the cam disk 3 on its front side has been provided with teeth with which a conveying pawl, for example a thrust pawl 2, engages. The thrust pawl 2 is operated by an eccentric 6 and the eccentric on its part is connected with a cocking lever 8 which scans or contacts a cocking curve or cam 5 of a control disk 4. The control disk 4, with interposition of one or more driving gears 18, is rotated by a motor 1.

The operation of the device is described in the following. The running motor 1 drives the cam disk 4 in the direction of arrow 13. The cocking lever 8 fitting against a hump 19 of the cocking curve 5, (shown in FIG. 1) is carried along by the hump 19 until the latter rolls off the cocking lever 8 and said cocking lever 8 will now scan the essentially evenly rising part of the cocking curve 5. In doing so, a spiral or tension spring 11, connected on the cocking lever 8 is cocked. The method takes the time necessary for the cocking lever 8 to reach the highest point of the cocking curve on the higher hump 20, FIG. 2. If now the control disk 4 continues to rotate in the direction of arrow 13, then the cocking lever 8 is suddenly released again and will strike again the hump 19 of the cocking curve 5 with the tension force of the spring 11. Instead of using the hump 19 as a stop, one can just as well use a locally fixed stop 14.

The eccentric in connection with the cocking lever 8 may be adjusted with regard to its angle, in relation to the cocking lever in such a way that the thrust pawl 2 will just achieve its maximum deflection in the rest position of the cocking lever 8.

In deviation from this, the stop in the form of a locally fixed stop 14 or a hump 19 of the cocking curve 5, can be omitted entirely. As a result of this, the eccentric will turn the dead center pertaining to the maximum deflection of pawl 2, which however is of no consequence for the conveyed movement of the pawl. If one uses the locally fixed stop 14, then it may be developed resiliently in order to protect the cocking lever 8.

The cocking lever 8 may be intercepted with the aid of hump 19 of the cocking curve 5 or with the locally fixed stop 14 even before the dead center of the eccentric. The effect which is striven for by the object of the invention will not be basically impaired thereby. It is obvious that the twisting angle α of the eccentric 6 in its absolute value, to be sure, depends on the adjusting angle α of the cocking lever 8 and that both angles are of the same size, but the shift to adjust the angle of the eccentric may change within certain limits without any impairment of the effect of the object of the invention that is to be attained.

On the basis of FIG. 2, a toggle lever drive will be described. In the case of this arrangement, likewise a cam disk 3 being an example for the control element, must again be moved gradually. This is accomplished, as in FIG. 1, with the thrust pawl 2, and this thrust pawl 2 is operated directly by a cocking lever 8. The cocking lever 8 has been mounted rotatably with the aid of a pivotal point 9 and a stretch between the attachment of the pawl 2 on the cocking lever 8 and the pivotal point 9 will act in this case, as a crank lever of the toggle lever drive.

The cocking lever 8, which is under spring tension of a spring 11, is moved, in the case of the toggle lever drive also by means of a cocking curve or cam 5 from a rest position, (shown in FIG. 2). The control disk 4 turns for this purpose in the direction of arrow 13, as a result of which the cocking lever 8 will slide over the hump 19 of the cocking curve 5. If the control curve 4 continues to turn, then the cocking lever 8 is continuously moved in the direction of the arrow 16, until it slides over another hump 20 of the cocking curve 5 and then is thrust with the aid of spring 11, against the hump 19. In this movement, the conveyed pawl 2 carries out its conveyed movement, and in the case of a maximal deflection of the pawl, the toggle lever may be stretched out, but, insofar as this may prove to be more favorable by way of construction, it may also be merely almost stretched out. The maximal deflection of pawl 2, as already mentioned, may be limited by means of a hump 19 of the cocking curve 5. Deviating from this however, one can also use a locally fixed stop 14 which possibly can be resilient. Furthermore, one can mention that one can also completely eliminate the stop for the cocking lever and in that case, upon the recoil of cocking lever 8, it will swing beyond the dead center.

The swiveling of the toggle lever drive beyond the dead center position will occur especially in those cases when the spring 11, in deviation from FIG. 2, has been hooked in directly on the conveying pawl 2. Such a spring may be hooked-in in such a way that it will take over the conveyance and at the same time the pressing of the pawl into the teeth and in that case the additional contact spring shown in FIG. 2, could be eliminated.

Furthermore, it would be possible in deviation from FIG. 2, to hook the spring directly into the joint 10 between the conveyed pawl 2 and the cocking lever 8.

Just as in the arrangement according to FIG. 1, the control disk 4, possibly with interposition of driving gears 18, can be driven by a motor 1.

Instead of the cam disk 4, a driver, for example a peg, attached eccentrically on a disk, can be used just as well. If the disk is turned in the same direction as cam disk 4, then the driver will likewise move the cocking lever 8 from its rest position.

I claim:

1. A device for the gradual movement of a mechanical control element, especially a cam disc, comprising a cocking lever mounted for movement about a pivot point at one end, a pawl drive element connected at one end to said cocking lever for pivotal movement at a predetermined distance from said pivot point, an energy accumulator for the device, means for energizing said accumulator so that, during a discharge of energy, pivotal movement of said pawl drive element is accelerated to move said cam disc.

2. The device according to claim 1 wherein said energy accumulator comprises a spring element fixed at one end and connected to said cocking lever at its other end.

3. The device according to claim 1 wherein an eccentric disc is provided at said cocking lever one end, said pawl drive member being pivotally connected thereto.

4. The device according to claim 1 wherein the interconnection of said cocking lever and said pawl drive element constitutes a toggle lever arrangement.

5. The device according to claim 1 wherein said energy accumulator comprises a spring element fixed at end and cooperating with said pawl drive element at its other end.

* * * * *